July 8, 1958 W. ZENOWITZ 2,841,948
EXTENSIBLE LAWN RAKE
Filed Aug. 10, 1956 2 Sheets-Sheet 1
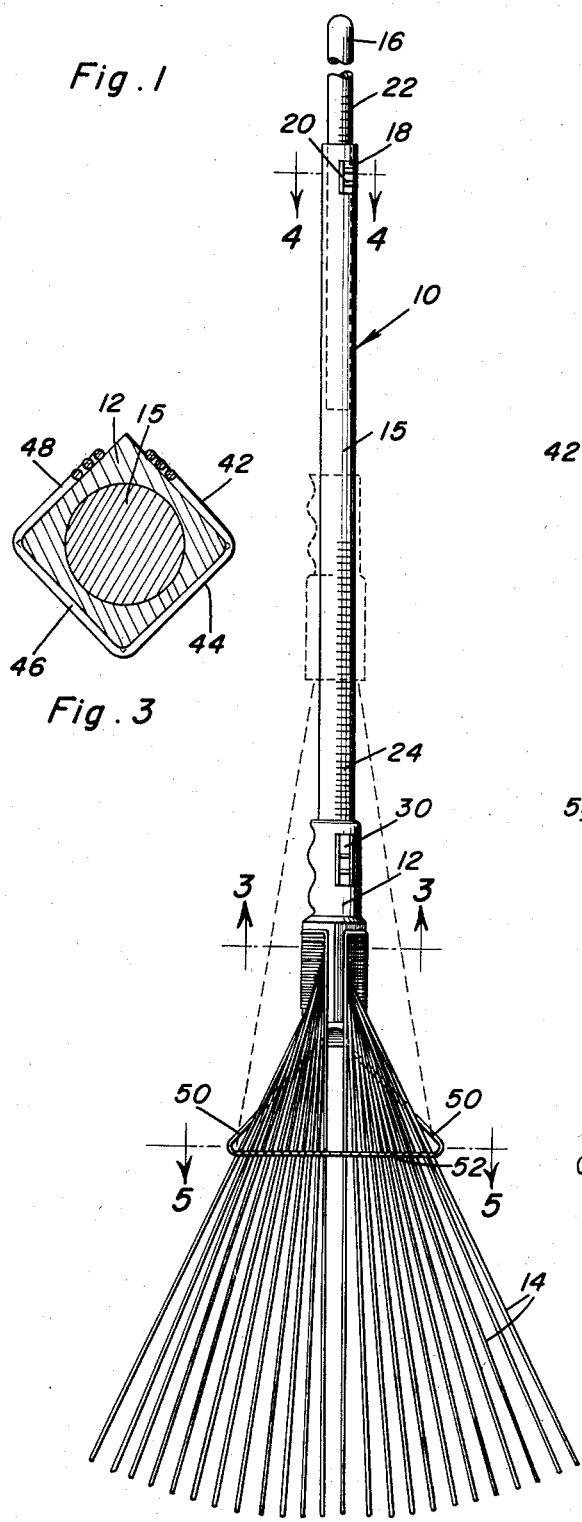
William Zenowitz
INVENTOR.

July 8, 1958
W. ZENOWITZ
2,841,948
EXTENSIBLE LAWN RAKE
Filed Aug. 10, 1956
2 Sheets-Sheet 2
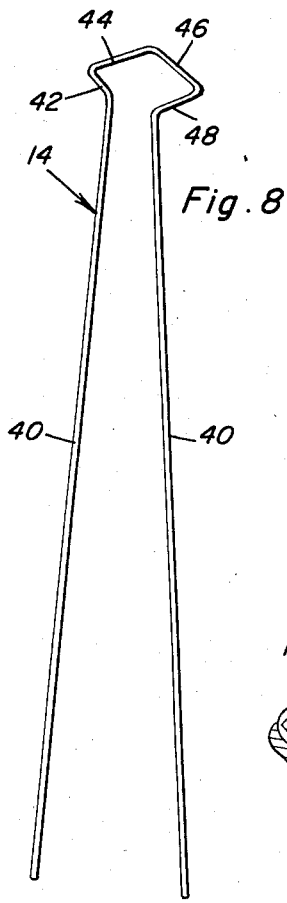
Fig. 8
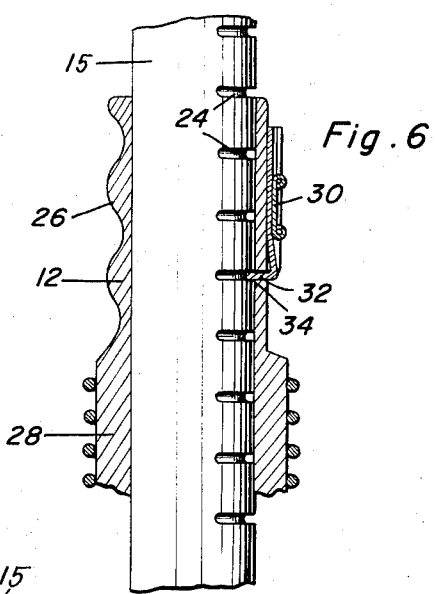
Fig. 6
Fig. 4
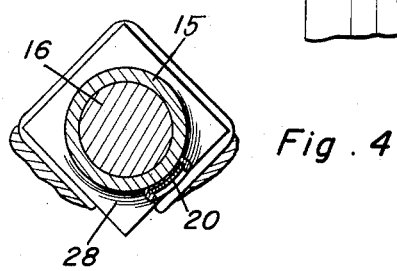
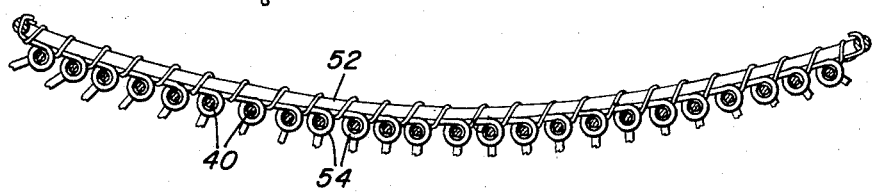
Fig. 5
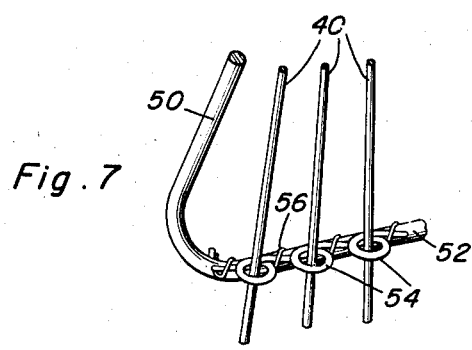
Fig. 7
William Zenowitz
INVENTOR.
BY *Clarence A. O'Brien
and Harvey B. Jacobson*
Attorneys

United States Patent Office 2,841,948
Patented July 8, 1958

2,841,948

EXTENSIBLE LAWN RAKE

William Zenowitz, Bloomfield, Conn.

Application August 10, 1956, Serial No. 603,366

5 Claims. (Cl. 56—400.18)

This invention comprises a novel and useful lawn rake and more particularly relates to a rake having a readily adjustable length of the fingers or tines and of the handle thereof.

The primary purpose of this invention is to provide a lawn rake wherein the tines may be readily adjusted to simultaneously extend or retract the same and thereby adjust the capacity of the rake.

A further object of the invention is to provide an extensible lawn rake in conformity with the foregoing object wherein the adjustable tines may be secured to a common member for simultaneously slidably adjusting all of the tines in a greatly simplified manner.

Yet another object of the invention is to provide an extensible lawn rake having slidably extensible and retractible tines together with improved means for guiding the same during their sliding movement and for mounting the same upon a common sleeve slidable upon the handle of the rake.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing a preferred embodiment of a lawn rake incorporating therein the principles of this invention, certain concealed positions of the parts and certain alternative positions thereof being shown in dotted lines therein, parts being broken away;

Figure 2 is an enlarged detail view in perspective of the sleeve to which the extensible tines are secured for simultaneously adjusting the same, some of the tines and certain of the parts being broken away;

Figure 3 is a horizontal sectional view taken substantially upon the plane indicated by the section line 3—3 of Figure 1 and showing the manner in which the tines are secured to the adjustable sliding sleeve of the device;

Figure 4 is an enlarged horizontal sectional view taken substantially upon the plane indicated by the section line 4—4 of Figure 1 and showing the manner in which the two sections of the rake handle are longitudinally adjustably secured to each other;

Figure 5 is an enlarged horizontal sectional view taken substantially upon the plane indicated by the section line 5—5 of Figure 1 and showing the manner in which the tines are guided upon the frame of the rake for sliding movement thereon;

Figure 6 is a detail view taken upon an enlarged scale in vertical section through the sleeve and showing the manner in which the tines are secured thereto and in which the sleeve is locked in adjusted position upon the handle of the rake;

Figure 7 is a perspective detail view illustrating the manner in which the tines are slidably guided in eyes carried by a portion of the frame of the rake; and, Figure 8 is a perspective view of one of the tine elements of the rake.

Referring now first to Figure 1, it will be seen that the embodiment of the lawn rake incorporating therein the principles of this invention consist of a longitudinally adjustable handle 10 having thereon a carriage 12 by means of which a plurality of tines 14 are mounted for sliding movement.

As will be observed, the handle 10 consists of a lower tubular member such as an aluminum rod or the like 15 in which is telescopically and slidably received an upper section 16. Adjacent its upper end, the section 15 is provided with a notch or cutaway portion 18, with which is associated any conventional form of a fastener or locking device 20 which cooperates with circumferentially extending longitudinally spaced locking notches or recesses 22 formed in the upper section 16. By this means the upper section 16 may be secured in telescopically adjusted position relative to the lower section thus providing a handle of any desired length.

Referring now especially to Figures 2 and 6, it will be seen that the lower section 15 of the handle is also provided with a longitudinally spaced series of circumferentially extending grooves or recesses 24 which constitute latching or locking recesses, for a purpose to be later set forth.

Slidable upon the lower section 15 of the handle is the previously mentioned carriage or sleeve 12. The latter may be constructed of metal, a plastic or any other suitable material, and consists of a generally cylindrical upper section having circumferentially disposed ridges 26 thereon to provide a convenient hand-grip surface as shown in Figure 6, and having a lower section 28 which is preferably rectangular or square in cross-section. The hand-grip portion 26, as shown in Figures 1 and 6, is provided with a locking or latch member 30 having a latching finger 32 extending through an aperture 34 in the carriage or sleeve for engagement in one of the locking recesses or grooves 24. It will be understood that the latch member 20 by which the lower section 15 is adjustably secured to the telescoping upper section 16 of the handle may be of a similar construction.

By this means, it will thus be apparent that the two sections of the handle may be individually adjusted relative to each other, and also that the sleeve 12 may be longitudinally adjusted and slid upon the handle and locked in adjusted position thereon for a purpose to be now set forth.

Referring again to the square portion 28 of the carriage or sleeve, it will be observed from a consideration of Figure 2 that the same serves to support for simultaneous sliding movement and adjustment the plurality of tines or fingers 14. The tines are preferably of a wire-like construction, and as shown in Figure 8, comprise a pair of downwardly divergent arms 40 which at their upper convergent ends are connected to a substantially square web portion. The latter comprises a series of sections indicated in Figure 8 by the numerals 42, 44, 46 and 48. The sections 42 and 48 are perpendicular to each other and at one end of each are secured to the arms 40, and at their other ends are secured to the sections 44 and 46 which are likewise perpendicular to each other. The four sections 42, 44, 46 and 48 thus provide a substantially rectangular open frame which is adapted to tightly frictionally grip and engage upon the exterior surface of the square portion 28 of the carriage or sleeve.

Referring now particularly to Figure 2, it will be seen that the uppermost rectangular frame portion of one of the tines has its depending arms 40 disposed adjacent each other, while the next lowest web portion of a tine has its arms disposed immediately outwardly of the arms of the first tine, this arrangement being repeated throughout the length of the tines, whereby the arms 40 may be uniformly divergent with respect to each other into a fan-shaped formation as shown in Figures 1 and 2. In order to facilitate the attachment of the web portions of the tines to the carriage or slide, the latter may be provided with channels, recesses or grooves for receiving the rectangular frame portions of the tines. Alternatively, these portions of the tines may be secured thereto by welding, or in any desired manner.

As so far described, it will now be apparent that upon longitudinal sliding movement of the carriage or slide upon the handle, the set of tines secured thereto will be likewise caused to have a corresponding movement.

Referring now especially to Figure 1, it will be seen that the lowermost end of the lower section 15 of the handle has a triangular-shaped frame secured thereto and depending therefrom, the same including side arms 50 which converge upon and are secured to the adjacent end of the handle section 15, and which at their divergent ends are connected by a transverse bow 52. The latter is preferably of arcuate shape as shown in Figure 5 and constitutes a frame for positioning and supporting the divergent tines of the rake.

As will be thus apparent from Figures 2, 5 and 7, a plurality of eyes 54 are formed in a rod-like element having its extremities secured to the bow 52 in any desired manner as by extending through apertures therethrough. A wire 56 wrapped about the member forming the eyes 54 is provided for rigidly securing the eyes in the desired spaced position upon the bow 52, the ends of this wire 56 being likewise secured to the bow as by extending into the same through the above mentioned apertures.

There is provided one eye for each of the arms 40 of the tines, these eyes serving to guide and slidingly receive the tines, as will be apparent by a comparison of Figures 2, 5 and 7. The arrangement is such that when the carriage, sleeve or slide 12 is moved downwardly, the divergent arms 40 sliding through the guides 54 will be spread further apart to thus increase the width of the rake and the length of the tines rendered effective thereon. Alternatively, when the sleeve 12 is moved upwardly upon the handle, the tines will be retracted, thus shortening the exposed ends of the same and bringing the ends of the tines closer together. It will thus be apparent that the width of the rake and the length of the tines may be readily adjusted as desired, and that the tines will be guided and supported in their sliding movement by their engagement and association with the guides 54.

There has thus been provided a rake having an improved means for mounting the plurality of tines; for effecting a longitudinal sliding movement of the tines to vary the length and width of the head of the rake; for guiding and supporting the tines during their adjustment; and for varying the length and handle of the rake.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An adjustable rake comprising a handle, a sleeve embracing said handle for longitudinal sliding movement thereon, a frame member carried by the lower end of said handle and having a bow disposed transversely thereof, guide eyes on said bow, a plurality of tines each peripherally embracing and secured to said sleeve and guidingly and slidingly received in one of said guide eyes, lock means operatively connected to said sleeve and handle for securing said sleeve in longitudinally adjusted position upon said handle.

2. The combination of claim 1 wherein said sleeve includes a portion which is rectangular in cross-section, said tines each comprising a rectangular web embracing said sleeve and having a pair of depending arms slidable through said guide eyes.

3. The combination of claim 1 wherein said guide eyes comprise loops in a rod-like member secured to said bow.

4. The combination of claim 1 wherein said handle comprises telescoping sections together with lock means operatively associated therewith for securing the sections in longitudinally adjusted position.

5. The combination of claim 1 wherein said handle includes longitudinally spaced, circumferentially extending grooves, said lock means comprising a latch carried by said sleeve and extending therethrough for coaction with said grooves.

References Cited in the file of this patent

UNITED STATES PATENTS

| 1,106,547 | Rocquin | Mar. 26, 1929 |
| 1,904,843 | Withington | Apr. 18, 1933 |
| 2,149,429 | Finkes | Mar. 7, 1939 |
| 2,536,607 | Jenkins | Jan. 2, 1951 |

FOREIGN PATENTS

| 224,009 | Great Britain | Nov. 6, 1924 |